April 11, 1967 G. L. LOWE 3,313,031
OPHTHALMIC LENS FORMER
Filed Nov. 16, 1964 2 Sheets-Sheet 1
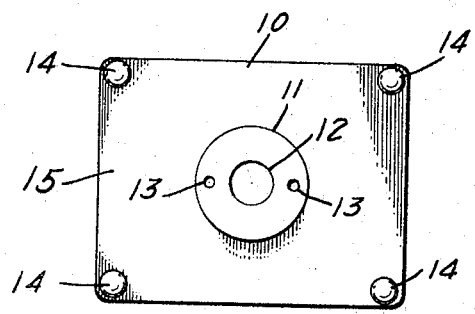
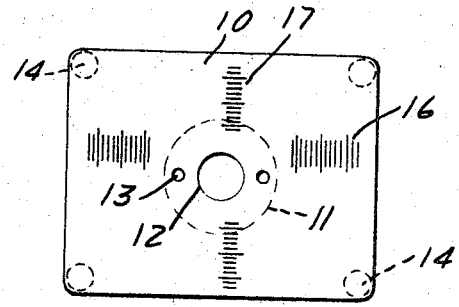
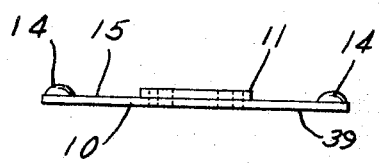
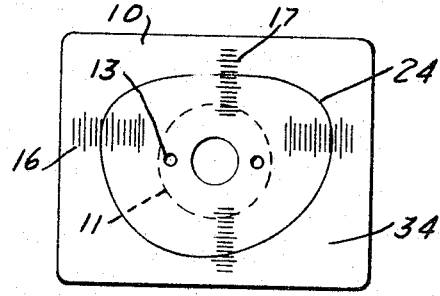
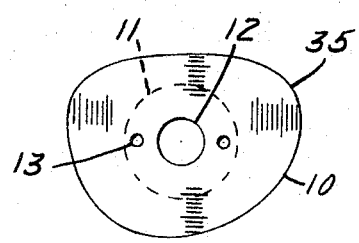
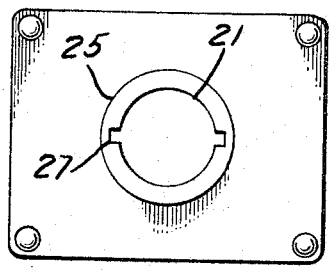
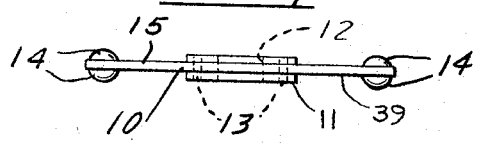
Inventor.
George L. Lowe
by Vincent C. Tyrrell
Agent April 11, 1967
G. L. LOWE
3,313,031
OPHTHALMIC LENS FORMER
Filed Nov. 16, 1964
2 Sheets-Sheet 2
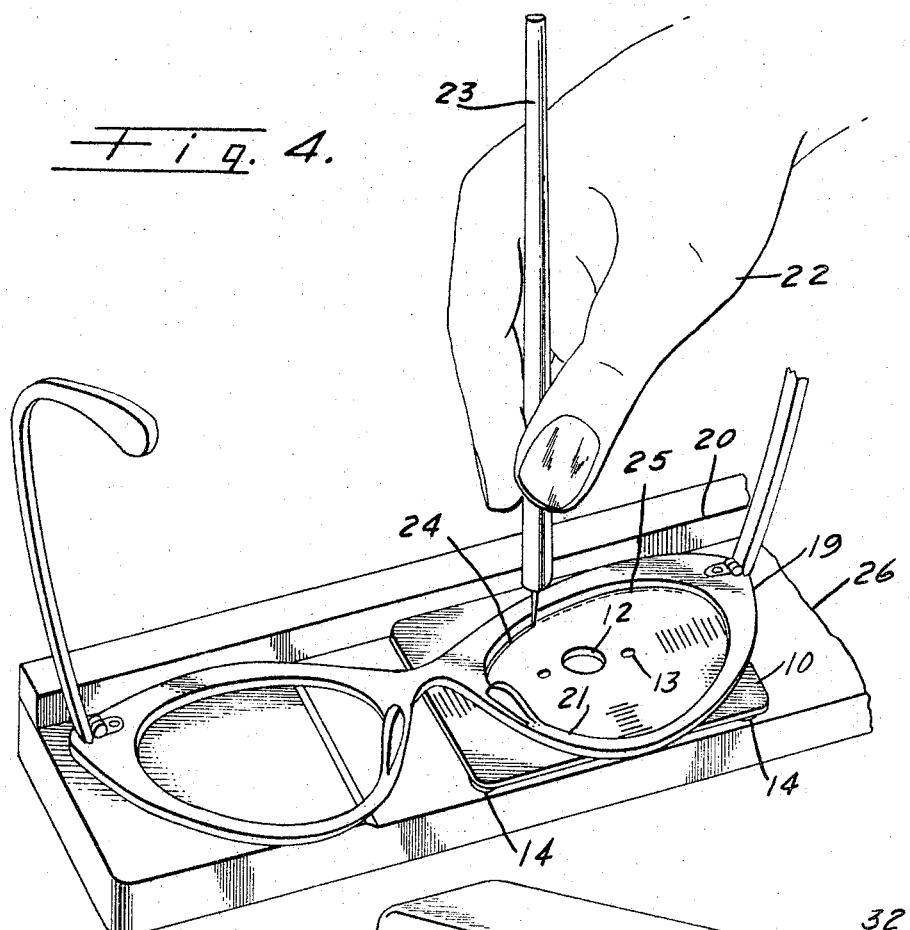
Fig. 4.
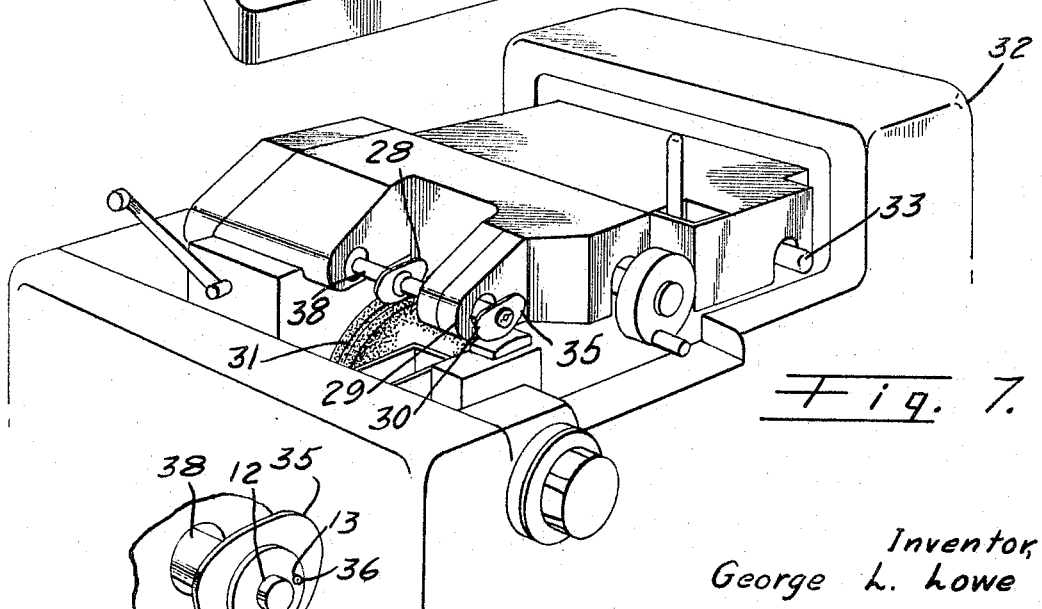
Fig. 7.
Fig. 9.
Inventor,
George L. Lowe
by Vincent C. Tyrrell
Agent

United States Patent Office 3,313,031
Patented Apr. 11, 1967

3,313,031
OPHTHALMIC LENS FORMER
George L. Lowe, 7920 Monmouth Ave.,
Panorama City, Calif. 91402
Filed Nov. 16, 1964, Ser. No. 411,326
4 Claims. (Cl. 33—174)

This invention relates to an ophthalmic lens former blank used in the manufacture of optical lenses for eyeglasses.

With the advent of the great number of new fashion eyeglass frames, the optical laboratories and optical technicians must obtain and keep lens formers made from lens former-blanks for the thousands of frames now being sold.

The lens former blanks presently available that can be readily and quickly formed with hand tools are made of thin metal or plastic. However, these lens formers are unstable when mounted upon the arbor of a lens cutting machine or a lens edging machine, sometimes falling off the arbor before the lens edging or cutting is finished.

Also available are thick plastic lens former blanks that are not adaptable for quick and easy forming to the needed lens outline. The present invention overcomes the above noted deficiencies and provides an ophthalmic lens former blank upon which can be scribed the outline of an optical lens. The finished lens former can then be made by trimming off the excess material with shears, for example, and the edges finally finished by buffing or filing off accurately to the scribed line.

Optical laboratories when presented with an order for optical lenses of a shape different from their stock of standard lens formers can in a few minutes using the ophthalmic lens former blank of this invention make an accurate lens former for cutting and edging the ordered lenses. Without this invention the dispensing optician would have to order the lens former from the supplier and lose valuable time or attempt to make the lenses by hand which at best results in a not too accurate and poorly made lens.

Another important use of the lens former blank is by the doctor prescribing the lens specifications. In the event a patient desires to use the same eyeglass frames and cannot see well without his eyeglasses, the doctor can remove one of the lenses from the frame, scribe the lens outline on one of the lens former blanks of this invention. He can then send the lens former blank and lens prescription to an optical laboratory and receive back an accurate lens shape that will then accurately fit the patient's eyeglass frames.

The primary object of the invention is to provide a novel lens former to be used as a guide to form and edge ophthalmic lenses.

Another object of the invention is a lens former that is economical to make and use to form optical lenses. Another object of the invention is a lens former blank made of plastic material that is easily cut to size by shears and finished by filing the edges to the scribed line.

Another object of the invention is to provide a plastic lens former to be used in edging lenses that is adapted to be rigidly attached to a lens edging machine.

Another object of the invention is to provide a lens former blank that has a thickened hub portion that provides lateral stability when used on a lens edging machine.

Another object of the invention is to provide a lens former blank made of plastic material that is self-lubricating and can be reused many times without changing its size and shape.

Further objects and advantages may be brought out in the specification wherein the preferred embodiment of the invention is described for the purpose of making a complete disclosure without intending, however, to limit the scope of the invention defined by the appended claims.

Referring to the accompanying drawings which are for illustrative purposes only:

FIG. 1 illustrates a bottom plan view of the ophthalmic lens former blank.

FIG. 2 illustrates a side elevation of the ophthalmic lens former blank.

FIG. 3 is a top plan view of an ophthalmic lens former blank having graduation marks to aid in using same.

FIG. 4 illustrates the ophthalmic lens former blank positioned for inscribing a lens outline thereon.

FIG. 5 is a top plan view of the ophthalmic lens former blank having the lens outline inscribed thereon.

FIG. 6 is a plan view of the finished lens former.

FIG. 7 is a view in perspective showing the ophthalmic lens former in position on a machine for edging ophthalmic lenses.

FIG. 8 illustrates a bottom plan view of an ophthalmic lens former blank having a different bore for attaching to a lens cutting or edging machine.

FIG. 9 is an enlarged perspective view of the finished lens former positioned on the arbor of a lens edging machine.

FIG. 10 illustrates a side elevation of an ophthalmic lens former blank.

Referring to the drawing, FIGURES 1 and 2 illustrate a lens former blank 10 from which the ophthalmic lens former is made. The blank is generally rectangular in shape and a centrally located hub portion 11 extends upwardly from surface 15. The hub 11 is provided with a central bore 12 and offset perforations 13. Protrusions or feet 14 are provided near the corners of the template blank. These protrusions extend from the surface 15 the same height as does the hub 11.

FIG. 3 is a top view of the template blank 10 illustrating horizontal and vertical graduated scales 16 and 17 to aid in positioning the eyeglasses frame 19 thereon as shown in FIG. 4.

FIG. 4 illustrates a method of marking or scribing the outline of the lens from the eyeglass frame 19 to the lens former blank 10. The one-half of the eyeglass frame is positioned over the lens former blank 10 using the edge 20 of the base 26 for holding the eyeglass frame steady. A line 24, 25 is scribed by a sharp tool 23 by hand 22 upon the template 10 using the inside of the frame 19 as a guide. The template 10 and scribed line 24 are shown in FIG. 5. The protrusions 14 aid in stabilizing lens former blank 10 when being scribed upon.

Shears may be used to remove the excess material 34 of the lens former blank outside of the scribed line 24.

The rectangular portion 39 is of a thinner cross section than the hub 11 so that shears may easily cut the material to the required outline. It has been found that in plastic materials a thickness of one-sixteenth of an inch provides for the rectangular portion 39 an ideal size. It is sturdy enough to provide lateral stability when used on a lens edging or cutting machine and provides good wearing qualities and at the same time allows easy cutting with shears for forming the desired lens outline.

After removal of the excess material 34 the resulting ophthalmic former is smoothly contoured with a file or with abrasive material to the scribed line 24. The finished ophthalmic former 35 is now ready to be used in cutting and edging optical lens to fit the eyeglass frame 19.

The same ophthalmic lens former may be used to cut or edge the other eyeglass lens by simply reversing the former on the arbor of the lens cutting and edging machine.

FIG. 8 illustrates the lens former blank of the invention with a bore of a different configuration designed to fit another lens cutting or edging machine. The lens former blank 18 has a thickened hub portion 25 with a large bore 21 and notches 27 to fit the arbor of another lens cutting or edging machine. It is contemplated that the hub portion may be changed to fit any number of different arbors without departing from the scope of the invention.

FIG. 9 is an enlarged perspective view of the ophthalmic lens former 35 in position on the arbor 37 of the lens edging machine 32.

FIG. 10 illustrates a lens former blank 10 having a relatively thin rectangular portion 39. The centrally located hub 11 extends outwardly from each side of the rectangular portion 39. The hub is provided with a central bore 12 and offset perforations 13. Protrusions or feet 14 are provided near the corners of the thin rectangular portion 39. These protrusions 14 extend from the rectangular portion the same extent as does the hub 11 and provide stability for the lens former blank when it is placed on a flat surface for scribbing the lens outline thereon.

To those familiar with this art, the use of the ophthalmic former will be briefly summarized as follows:

As shown in FIG. 7 the ophthalmic former 35 is placed on the arbor 38 of a lens edging machine 32. The lens former is held against rotation on the arbor 37 and through bore 12 and by pins 36 through perforations 13. A rough cut lens 28 is held in alignment with the lens former 35 on the arbor 37. The arbor 37 is supported by the head 29 which is free to float on a pivot around hinge point 33. A power source not shown rotates the arbor 37 against a rotating grinding wheel 31. The lens former rotates upon a pad 30 and transmits through the floating head 29 the precise shape of the ophthalmic former to the lens being edged or cut.

The ophthalmic former has been made and used and found to be very efficient, inexpensive and quick to fabricate. The thickened hub portion 11 maintains lateral stability not found in thinner templates.

I claim:

1. A plastic ophthalmic lens former blank for optical lenses used in eyeglasses of the kind on which the outline of the lens is scribed on the former blank from the eyeglass frame comprising:
   a thin rectangular flat body portion having a back face and a front face, said front face being adapted for inscribing said lens outline, said flat body portion adapted to being cut with ordinary household scissors to said lens outline;
   a thickened hub portion extending laterally from said back face; and protrusions extending laterally from said back face the same amount as said hub portion, said protrusions being positioned outside the area of said lens outline.

2. A plastic ophthalmic lens former blank for optical lenses used in eyeglasses of the kind on which the outline of the lens is inscribed on the lens former blank from the eyeglass frame, the lens former blank is cut to the scribed outline of the lens and placed on a lens cutting or edging machine to make the finished optical lens, comprising:
   a thin rectangular flat body portion having a back face and a front face, said front face being adapted for inscribing the lens outline thereon, said flat body portion being of a thickness whereby ordinary shears may be used to remove material of said flat body portion outside area of said lens outline;
   a centrally located thickened hub portion extending laterally from said back face;
   mounting means through said hub portion for securing said lens former blank to said lens cutting and edging machine and protrusions extending laterally from said back face the same extent as said hub portion, said protrusions being positioned outside the area of said lens outline.

3. A plastic lens former blank for optical lenses used in eyeglasses of the kind on which the outline of the lens is scribed on the lens former blank by using the eyeglass frame as a guide comprising:
   a thin, rectangular, flat body portion having a back face and a front face, said front face being adapted for inscribing said lens outline;
   a thickened hub portion extending laterally from said back face of said flat body portion, said hub portion having mounting means thereon; and
   protrusions extending laterally from said back face of said flat body portion the same extent as said hub portion, said protrusions being positioned outside the area of said lens outline.

4. An ophthalmic lens former blank for optical lenses used in eyeglasses of the kind on which the outline of the lens is scribed on the lens former blank from the eyeglass frame, comprising:
   a thin, rectangular, flat body portion having a back face and a front face, said front face being adapted for inscribing said lens outline thereon, said flat body portion being of a thickness whereby shears may be used to remove the material of said flat body portion outside the area of said lens outline;
   a thickened hub portion extending laterally from said back face;
   mounting holes through said hub portion and said body portion; and
   protrusions extending laterally from said back face the same extent as the extension of said hub portion, said protrusions being positioned outside the area of said lens outline.

References Cited by the Examiner

UNITED STATES PATENTS

| | | | |
|---|---|---|---|
| 383,697 | 5/1888 | Bormann | 33—30 X |
| 1,063,969 | 6/1913 | Hackes | 33—174 |
| 1,426,830 | 8/1922 | Fraser | 101—128.1 X |
| 1,455,863 | 5/1923 | Bugbee | 51—101.1 |
| 1,520,445 | 12/1924 | Rushmer | 33—174 |
| 2,190,582 | 2/1940 | Wolf | 33—174 |
| 3,119,206 | 1/1964 | Baumgartner | 51—101.1 |
| 3,170,374 | 2/1965 | Clar | 51—101.1 X |

FOREIGN PATENTS

| | | |
|---|---|---|
| 1,051,677 | 2/1959 | Germany. |
| 17,346 | 1894 | Great Britain. |

LEONARD FORMAN, *Primary Examiner.*

H. N. HAROIAN, *Assistant Examiner.*